(No Model.)
T. BURKHARD.
MIXING AND HEATING AND COOLING KETTLE FOR CANDY, &c.
No. 338,583. Patented Mar. 23, 1886.
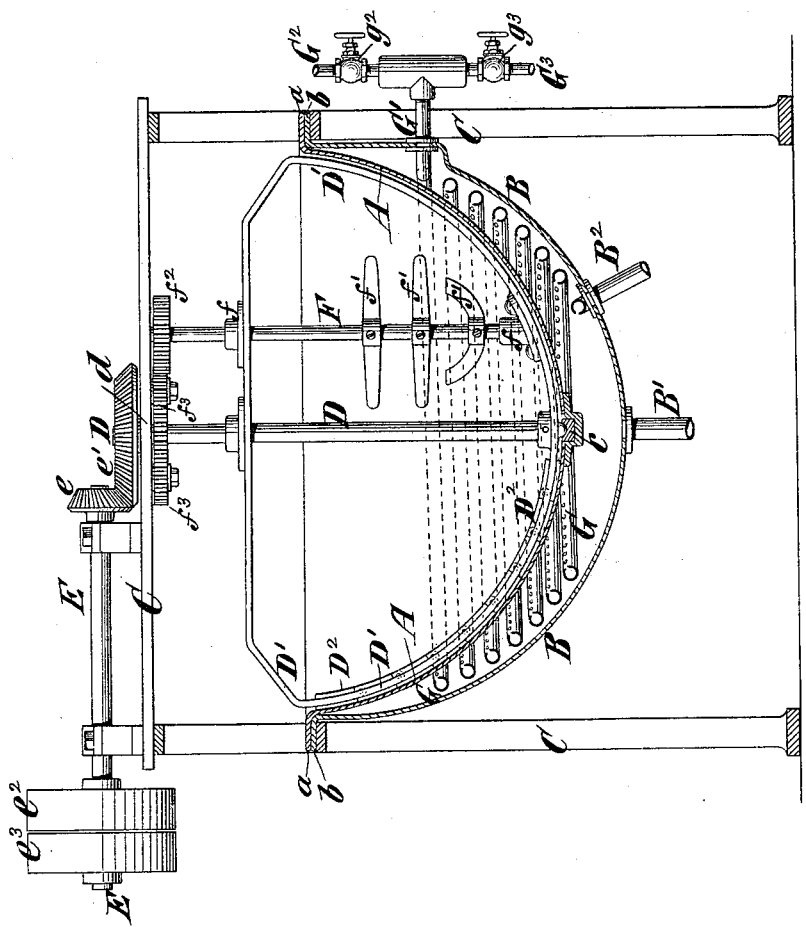

UNITED STATES PATENT OFFICE.

THOMAS BURKHARD, OF BROOKLYN, NEW YORK.

MIXING AND HEATING AND COOLING KETTLE FOR CANDY, &c.

SPECIFICATION forming part of Letters Patent No. 338,583, dated March 23, 1886.

Application filed December 24, 1885. Serial No. 186,616. (No model.)

*To all whom it may concern:*

Be it known that I, THOMAS BURKHARD, of Brooklyn, in the county of Kings and State of New York, have invented a new and useful Improvement in Mixing and Heating and Cooling Cooking-Kettles for Candy, &c., of which the following is a specification.

My invention relates to kettles wherein candy or other substance may be mixed and cooked or boiled, and, if desired, cooled after the cooking or boiling has been completed. This enables mixing without boiling, or cooking and mixing with boiling, or cooking and afterward cooling the contents of the kettle, to be all done in one apparatus, which has not been before customary.

In what I now consider its most complete form, the invention consists in a kettle having a surrounding jacket, and within which are arranged a mixing or stirring apparatus and a chain clearer or scraper, a distributer arranged within the jacket, and which is perforated for the distribution of jets of steam or other heating-fluid and water or other cooling-fluid against the exterior of the kettle, and pipes and valves, whereby a heating or cooling fluid, as may be desired, is supplied to the distributer so arranged within the jacket. This distributer may advantageously consist of a coil of pipe, having those portions of its convolutions which are toward the kettle perforated, for delivering jets of heating or cooling fluid.

The accompanying drawing represents a sectional elevation of an apparatus embodying my invention.

A designates a kettle, which may be of copper or other metal, and which is surrounded by a jacket, B. The kettle and jacket may be provided with flanges $a\ b$, whereby they are supported upon a suitable frame-work, C. Within the kettle is a vertical shaft, D, which is supported in a step-bearing, C, in the bottom of the kettle and in a bearing, $d$, in the upper part of the frame C, and to which rotary motion may be imparted by a driving-shaft, E, and gearing $e\ e'$. The shaft E may be rotated by hand or by power, and I have shown it as provided with fast and loose pulleys $e^2\ e^3$, for the reception of a driving-belt. The shaft D carries a skeleton frame, D′, the outline of which conforms somewhat to the inner profile of the kettle, and D² designates a chain scraper or clearer, which is composed of blocks pivoted together so that the profile of the chain may conform to the interior of the kettle. Such a chain scraper or clearer is not new, and the purpose of the skeleton frame D′ is to drive or propel the scraper D² around the kettle, so that it will remove from the interior surface of the kettle such of the contents as lie in contact therewith, and produce an agitation or movement of the cooking substance in the kettle, which will prevent it from burning by adhesion to the interior thereof. The chain scraper or clearer D², being composed of blocks pivoted together, will readily conform to the interior of the kettle, as shown in in the drawing.

Within the kettle A, I have represented a mixing apparatus, which consists of an upright rotary shaft, F, journaled at $f$ in the frame D′, and provided with stirrers or mixing-blades, $f'$. This shaft has upon it a pinion or wheel, $f^2$, which engages a gear-wheel, $f^3$, fixed to the upper portion of the frame C and incapable of rotation. As the shaft D is rotated, the stirrer or mixer shaft F is carried around by the frame D′, and its wheel $f^2$, being in engagement with the non-rotary wheel $f^3$, produces a continuous rotation of the shaft F and the stirring or mixing blades $f'$.

Within the jacket B is arranged a distributer for heating or cooling fluid, and which, as here shown, consists of a coiled pipe, G, the convolutions of which are perforated, so as to deliver jets of heating or cooling agent against the exterior surface of the kettle A.

Where it is desired to employ the kettle only for heating and mixing, I may provide a single pipe, G′, for the admission of heating-fluid to the distributer G; but where the kettle is to be used for both heating and cooling, I connect with the pipe G′ branch pipes G² G³, which are provided with valves $g^2\ g^3$, and by which either steam or other heating agent or water or other cooling agent may be admitted to the coil-distributer G, as may be desired.

From the bottom of the jacket B extends an outlet-pipe, B′, for conveying away water or other cooling agent, or for conveying away water which may result from the condensation of steam employed as a heating agent, and a second pipe, B², also extending from the jacket, for conducting away any steam, which may remain uncondensed therein.

By my invention I provide a single inexpensive apparatus, which may be employed for a number of purposes in the manufacture of confectionery and the treatment of other substances.

The mixing of several substances together may be performed in the kettle without either heating or cooling such substances; or they may be heated while they are being mixed, and may also, if desired, be cooled after cooking or boiling by the heating-fluid is completed.

It is obvious that either steam or hot air may be used as a heating-fluid, and water or other liquid or fluid may be employed as a cooling agent.

What I claim as my invention, and desire to secure by Letters Patent, is—

1. The combination, with a kettle and a surrounding jacket, of a distributer arranged within the jacket and perforated for the discharge of the heating or cooling fluid in jets against the exterior of the kettle, and a pipe for supplying heating or cooling fluid to the distributer, substantially as herein described.

2. The combination, with a kettle and a surrounding jacket, of a distributer arranged within the jacket, and perforated for the discharge of heating or cooling fluid in jets against the exterior of the kettle, and pipes and valves by which either a heating or cooling fluid may be supplied to the distributer, substantially as herein described.

3. The combination, with a kettle and a surrounding jacket, of a coil arranged within the jacket and perforated for the discharge of jets of heating or cooling fluid against the kettle, and a pipe for supplying a heating or cooling fluid to the coil, substantially as herein described.

4. The combination, with a kettle having a surrounding jacket, of a mixing or stirring apparatus operating within the kettle, and pipes and valves for supplying to the jacket both heating and cooling fluid at will, whereby provision is afforded for simultaneously mixing and cooking and then cooling the contents of the kettle, substantially as herein described.

THOS. BURKHARD.

Witnesses:
  FREDK. HAYNES,
  M. LINDEMAN.